United States Patent
Runyan (10) Patent No.: US 10,143,870 B2
(45) Date of Patent: Dec. 4, 2018

(54) FLUID CONDUIT RAMP

(71) Applicant: Daniel J. Runyan, Rodanthe, NC (US)

(72) Inventor: Daniel J. Runyan, Rodanthe, NC (US)

( * ) Notice: Subject to any disclaimer, the term of this patent is extended or adjusted under 35 U.S.C. 154(b) by 547 days.

(21) Appl. No.: 14/799,963

(22) Filed: Jul. 15, 2015

(65) Prior Publication Data

US 2016/0016024 A1 Jan. 21, 2016

Related U.S. Application Data

(60) Provisional application No. 62/026,175, filed on Jul. 18, 2014.

(51) Int. Cl.
| | | |
|---|---|---|
| *F16L 9/22* | (2006.01) | |
| *A62C 33/06* | (2006.01) | |
| *F16L 57/02* | (2006.01) | |
| *F16L 9/00* | (2006.01) | |

(52) U.S. Cl.
CPC ............. *A62C 33/06* (2013.01); *F16L 9/003* (2013.01); *F16L 9/22* (2013.01); *F16L 57/02* (2013.01)

(58) Field of Classification Search
CPC ............. F16L 9/003; F16L 9/22; A62C 33/06
USPC ................................. 404/3; 138/106
See application file for complete search history.

(56) References Cited

U.S. PATENT DOCUMENTS

| | | | | |
|---|---|---|---|---|
| 374,348 | A * | 12/1887 | Cook | F16L 58/182 |
| | | | | 138/116 |
| 5,385,431 | A * | 1/1995 | Topf, Jr. | A62C 33/00 |
| | | | | 138/105 |
| 5,755,527 | A | 5/1998 | Dufresne | |
| 6,067,681 | A * | 5/2000 | Zeinstra | A62C 33/06 |
| | | | | 138/106 |
| 6,286,874 | B1 * | 9/2001 | Duchek | F16L 57/00 |
| | | | | 404/3 |
| 6,287,047 | B1 | 9/2001 | Dufresne | |
| 8,342,211 | B2 * | 1/2013 | King | F16L 3/26 |
| | | | | 138/106 |
| 8,784,010 | B1 * | 7/2014 | Cessac | F16L 9/19 |
| | | | | 404/15 |
| D719,519 | S * | 12/2014 | Mathena | D13/155 |
| D763,414 | S * | 8/2016 | Allin | D13/155 |
| 2016/0016024 | A1 * | 1/2016 | Runyan | A62C 33/06 |
| | | | | 285/114 |

OTHER PUBLICATIONS

Ziamatic Corp.; 16" Wide Extruded Bridge Set—5" Hose; www.ziamatic.com/catalog.php?item_id=97131.
Checkers Industrial Safety Products; Standard Hose Bridge; 222.checkersindustrial.com/products/cable-protectors/hose- . . .

* cited by examiner

*Primary Examiner* — David Bochna
(74) *Attorney, Agent, or Firm* — W & C, IP

(57) ABSTRACT

A fluid conduit ramp construction provides partitions within a low profile outer conduit to reduce weight and increase strength while having a reduced device pressure loss at high flow rates such as are required for fire-fighting circumstances where large quantities of water must be supplied across a road or thoroughfare. The fluid conduit ramp may be rigid or flexible and of sufficient width to unconditionally provide fluid conduit cross-sectional areas larger than the nominal diameter of fire hose with which it is used. The fluid conduit ramp can be quickly deployed by one or two persons requiring only a short duration of traffic interruption after which traffic flow may be resumed at higher speeds than are possible using hose bridges.

22 Claims, 4 Drawing Sheets

FLUID CONDUIT RAMP

CROSS-REFERENCE TO RELATED APPLICATIONS

This application claims benefit of priority of U.S. Provisional Patent application 62/026,175, filed Jul. 18, 2014, which is hereby incorporated by reference in its entirety.

FIELD OF THE INVENTION

The present invention generally relates to fire-fighting equipment and, more particularly, to apparatus for providing water across streets, roads and other thoroughfares while minimizing interruption of vehicular traffic.

BACKGROUND OF THE INVENTION

Fires can occur at any location combustible materials are present and, unless extinguished, will usually increase and spread until all available combustible material present or within a drift range of burning or heated particles is ignited and then consumed. The conventional method of combating fires is to spray large volumes of water (sometimes including small amounts of other chemicals) on the combustible material at the base of the fire (e.g. for rapid cooling) and on combustible material above and adjacent the fire (e.g. to reduce likelihood of combustion and spreading of the fire. In most areas where population density is at least moderate or higher, water is generally supplied through a network of pipes or distribution systems for potable water and made available at fittings known as hydrants located periodically along such pipes or distribution systems; allowing trained personnel to attach hoses to convey water from the hydrants to the proximity of a fire.

As a matter of convenience, visibility and accessability of hydrants, such pipes or distribution systems are usually installed along one side of a street, road or other thoroughfare. However, since fires can occur at any location where combustible materials are present, such a location for hydrants requires that one or more hoses be positioned across such thoroughfares in order to carry water to the location of the fire in a substantial fraction of fire occurrences. While hoses generally used in fire-fighting are of very robust construction, allowing traffic to pass over them is highly undesirable due to the potential for damage to the hoses, which are quite expensive. Further, compression of a hose by the weight of a vehicle reduces or halts water flow in the hose and, in any case, causes substantial fluctuations in pressure which can impair operation of or cause damage to pumping equipment or other water conveying devices.

Therefore, in instances where one or more hoses must cross a thoroughfare, traffic must be halted or re-routed until some protective cover for the hose, referred to as a hose bridge, can be installed. Such devices typically form a ramp on opposite sides of a hose and a structural connection between the ramps and above the hose that will bear the weight of a vehicle and are thus structural "bridges" over hoses which are generally in use and filled with water at an elevated pressure when the hose bridges are installed.

While several designs of hose bridges are known and commercially available, such hose bridges present some difficulties and shortcomings in deployment and use. One major difficulty at the present time is the need to protect hoses of a nominally five inch diameter which are in widespread use at the present time to reduce pressure loss (e.g. in comparison with smaller standard diameter hoses) at high-volume flow rates. For example, one known form of hose bridge is formed in pairs to be located where vehicle tires are likely to pass with each hose bridge of the pair comprising a plurality of interlocking aluminum extrusions of limited length (e.g. about eighteen inches) to minimize storage space. This type of hose bridge is generally of a weight that can be handled by a single person but spacing of the hose bridges of a pair is somewhat critical to match the separation of tires on a vehicle axle so that the vehicle tires do not, in fact, contact the hose. Further, no protection is provided for the hose between the hose bridges. That is, when one axle of a vehicle has passed over the hose bridge but another axle of the vehicle has not yet reached the hose bridge, clearance of the vehicle above the hose is minimized (especially if the vehicle suspension allows some degree of recoil) and structure of the bottom of the vehicle body between the wheels may contact and damage the hose.

An alternative commercially available hose ramp comprises somewhat longer (e.g. about seventy inches) ramp-shaped sections of steel or aluminum having grooves or passages on the underside to accommodate hoses of different diameters and which can be interlocked to provide a hose bridge which is wider than roadway vehicles. Vertical apertures are formed therein to reduce weight and improve traction but sections of this type of hose bridge nevertheless weigh about sixty pounds each or a total of two hundred forty pounds for the complete hose bridge, compromising assembly, as does the need to align hoses with the grooves or passages.

It should be appreciated that either of these commercially available types of hose bridge requires material above the hose as well as spacing from the hose to allow for some deformation under load of the hose bridge without compressing the hose. Therefore, the overall height of either of these types of hose bridge, to accommodate a nominal five inch outside diameter hose, must be at least six inches with the latter type of hose bridge described above approaching seven inches; requiring such hose bridges to be traversed by vehicles at very low speeds and generally requiring some arrangement to avoid the hose bridge from being moved by the force of vehicle tires against the sides thereof. Such a height also exceeds the ground clearance of many automobiles currently in service but cannot be reduced without requiring use of smaller diameter hoses (e.g. 2½ inch nominal outside diameter) which reduce water flow rates and cause pressure drops over even relatively short lengths of hose at high flow rates. For example, at flow rates near one thousand gallons per minute, a pressure drop of 100 psi over fifty feet of 2½ inch diameter hose is not unusual whereas a three hundred foot length of five inch hose would produce a pressure drop of only thirty to forty psi at comparable flow rates.

SUMMARY OF THE INVENTION

It is therefore an object of the present invention to provide an alternative to the use of a hose ramp that can be easily deployed and which is of reduced height to prevent damage to the underside of vehicles and reducing impediments to traffic by allowing traversal at higher speeds.

It is another object of the invention to provide an alternative to hose bridges which limits pressure drop therein at high flow rates.

It is a further object of the invention to provide an alternative to hose bridges which is of comparable weight and storage size to currently commercially available hose bridges.

In order to accomplish these and other objects of the invention, a fluid conduit ramp is provided comprising an array of laterally adjacent internal fluid conduits formed by vertical partitions extending between and affixed to upper and lower panels wherein said internal fluid conduits at lateral sides of said array form ramps, and a manifold and fluid carrying connection at each end of said array of laterally adjacent internal fluid conduits, wherein said manifold is configured to direct fluid flow from said hose connection laterally to provide maximum total fluid flow through said array of internal fluid conduits.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figures 1, 2, 3, 3A:
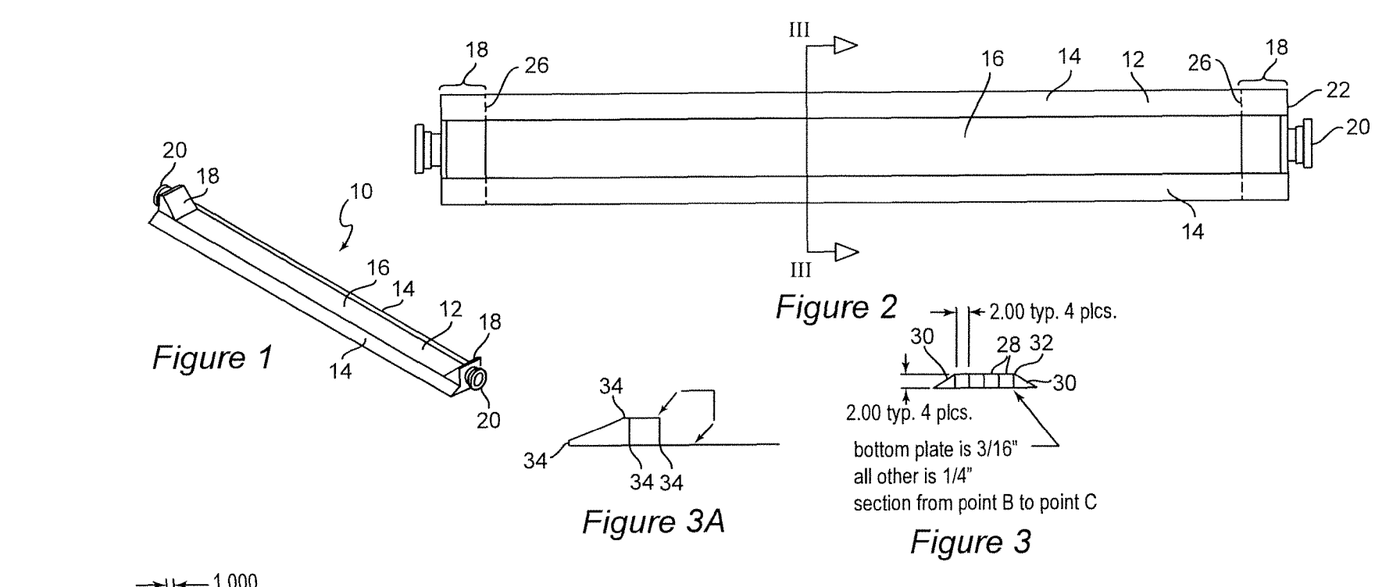
FIG. 1 is an isometric view of the fluid conduit ramp in accordance with the invention.
FIG. 2 is a plan or top view of the fluid conduit ramp in accordance with the invention.
FIG. 3 is a cross-sectional view of the fluid conduit ramp in accordance with the invention taken at section III-III of FIG. 2.
FIG. 3A is an enlarged detail of a portion of FIG. 3 illustrating a possible construction method for the fluid conduit ramp in accordance with the invention.

Referring now to the drawings, and more particularly to FIG. 1, there is shown an isometric view of the fluid conduit ramp 10 in accordance with the invention. Reference is also made to FIG. 2 which is a top or plan view of the fluid conduit ramp in accordance with the invention in which principal features shown in FIG. 1 are also visible. The invention is essentially an elongated fluid conduit 12 having a trapezoidal overall shape in cross-section such that the width is substantially greater than its height to provide a low profile and an angled ramp 14 is provided on both lateral sides of a generally rectangular central section 16. The overall length of the fluid conduit ramp 10 is preferably about eleven feet or comparable to the width of a traffic lane on a street or road and greater than the width of most highway vehicles. The fluid conduit ramp 10 can also be made in shorter lengths, if desired, to reduce weight of individual sections but such an embodiment is not preferred since shorter sections must be connected with proper spacing which requires additional time to deploy and pressure loss due to viscous drag of fluid flowing at a high flow rate (referred to as device loss) is increased over a longer single piece embodiment for a comparable total length. The width of the triangular ramp portions 14 can be of any desired dimension to make the ramps suitably shallow but it is considered that extending the ramp more than about three to four inches or about 150% to 200% of the height from the rectangular portion 16 is not warranted in regard to ease of being crossed by vehicles or forces imposed by contact with vehicle tires while potentially increasing weight and/or requiring additional internal vertical support.

Figure 6A:
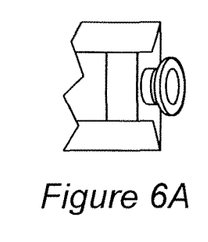
FIGS. 6A, 6B, and 6C are top, side and isometric views of a first perfecting feature of the invention.
Figure 6B:
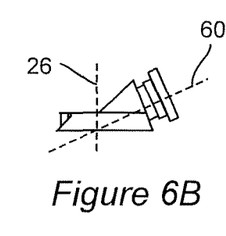
Figure 6C:
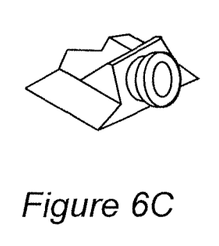

A manifold 18 and fluid-carrying connection (e.g. a hose coupling) 20, preferably of the Storze type (generally an industry standard at the present time) is preferably provided at both ends of fluid conduit 12. The manifold 18 is preferably substantially vertical at end surfaces 22 to allow two or more fluid conduit ramps in accordance with the invention to be coupled together directly or with short lengths of hose to allow fluid conduit ramps to be assembled to cross more than one traffic lane of a street or road. However, the end surface 22 and connector 20 can be angled upward by up to 45° or possibly more for convenience in attaching hoses to fluid conduit ramp 10 and/or to more fully direct fluid flow throughout manifolds 18 to reduce internal pressure drop within the fluid conduit ramp while only slightly compromising the end-to-end coupling of fluid conduit ramps with hose. A preferred upward angling of the hose connection at a manifold is illustrated in FIGS. 6A-6C and will be discussed below as a perfecting feature of the invention. However, it has been found that much the same effect can be provided by an angled surface 24 of manifold 18. The short length of connecting hose and/or the manifolds 18 can generally be adequately protected from vehicular traffic by a so-called traffic cone or barrel or other suitable portable barrier.

Referring now also to FIG. 3, a cross-section of the fluid conduit ramp 10 taken at section line III-III of FIG. 2 is shown. The internal structure shown in this cross-section is preferred to be substantially the same over the length of the fluid conduit ramp 10 between manifolds 18 although weld beads are preferably not continuous, as will be discussed in greater detail below. The ends of the internal structure are indicated by dashed lines 26 and labeled "point B" and "point C" in FIG. 4. Other internal structure patterns are possible but the internal structure illustrated in FIG. 3 is preferred as having sufficient load-bearing strength at adequately low weight and internal surface area.

Figure 8A:
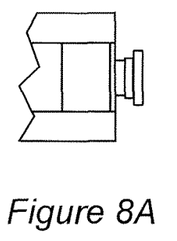
FIGS. 8A, 8B, and 8C are top, side and isometric views of a third perfecting feature of the invention.
Figures 8B, 8C, 9B, 9C:
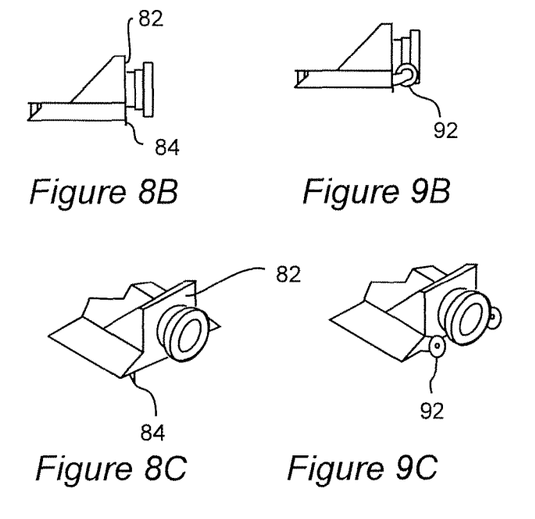
FIGS. 9A, 9B, and 9C are top, side and isometric views of a fourth perfecting feature of the invention.

The preferred internal structure is essentially an array of four or more rectangular and preferably substantially square sub-conduits (also referred to as internal conduits) formed by vertical partitions within a single trapezoidal water-tight conduit and nominally two inches on a side as an outside measure. At the sides of the array of substantially square sub-conduits are two right-triangular sub-conduits 30 forming ramps having the same outside height as the substantially square sub-conduits and a width chosen as a trade-off between strength in the vertical direction, fluid flow resistance in the narrow ends of the cross-section and weight, as alluded to above. A width of about three inches or about 50% greater than the span of the substantially square sub-conduits is considered to be optimal but non-critical. The angle resulting from these dimensions also approximates the contour of the outer surface on an automobile tire which is also considered to be desirable since the initial contact of a tire with the fluid conduit ramp will be at or close to the side of an outermost substantially square sub-conduit (as indicated at 32) and will thus reduce the load carried by the angled portion of the ramp as a vehicle tire passes across it as well as reducing the force in the horizontal direction applied by the tire while increasing the vertical force (and traction) of the fluid conduit ramp on underlying pavement and/or soil to reduce the tendency to shift horizontally as a tire passes across it. Small protrusions may optionally be provided on the bottom surface of the fluid conduit ramp to further resist horizontal movement; an exemplary form of which is illustrated in FIGS. 8A-8C and will be discussed below as another perfecting feature of the invention.

This cross-sectional structure of FIG. 3 can be achieved in many different ways which will be apparent to those skilled in the art such as by welding of common structural metal shapes which may be commercially available or formed by bending of sheet material to provide a sequence of structural angle shapes as illustrated in FIG. 3A. However, this method of construction is not preferred even though it avoids the use of tubes which add additional weight without significantly increased strength since it requires welded or brazed joints forming the exterior of the fluid conduit ramp to extend the full length of the fluid conduit ramp; entailing additional labor, expense, thermal distortion (as the welds or brazing joints cool) and potential for leakage.

Figure 3B:
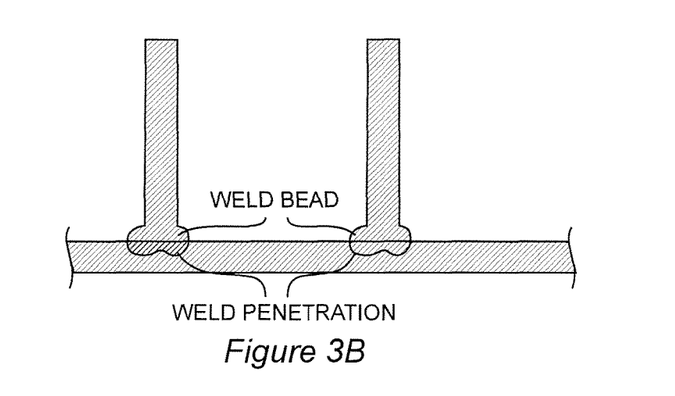
FIGS. 3B and 3C illustrate details of a preferred method of constructing the fluid conduit ramp in accordance with the invention.
Figure 3C:
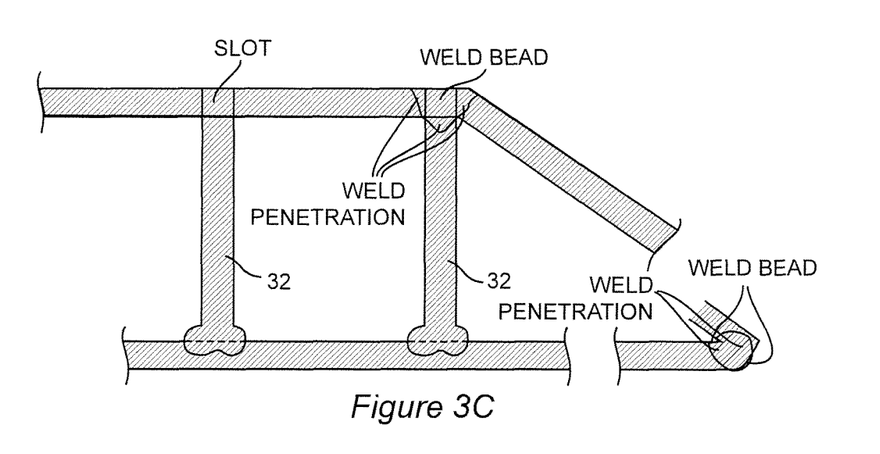

Instead, it is currently preferred to form the structure illustrated by bending a top plate to form the angled ramps as illustrated in FIG. 3 and then welding or brazing ¼ inch thick strips of preferably 6061 aluminum to an outer (e.g. either the top or bottom) plate of preferably the same material forming discontinuous beads of approximately one inch length on preferably twelve inch (or less) centers on both sides of the strips. The weld or brazing beads will assume the approximate shape of a fillet at the junction of the strip and the plate and will thus securely hold and reinforce the positioning of the strips/partitions perpendicular to the top or bottom plate as shown in FIG. 3B. The other of the outside plates is then preferably attached to the free ends of the strips by a technique known as slot welding or brazing. In this technique, a slot is formed in the plate at the attachment location and the weld or brazing bead formed through the slot on the top of the edge of the strip/partition and built up to re-fill the slot while bonding to the plate as shown in FIG. 3C, depicting slots and strips both before and after forming a slot weld. These slot welds are also preferably formed of approximately one inch length on twelve inch (or less) centers and preferably opposite the locations of welds on the other outer plate to counteract distortions due to cooling of the weld or braze bead after the weld material solidifies. The ends of the angled portion of the top plate can then be welded or brazed to the bottom plate with continuous beads as illustrated in FIG. 3C. It should also be noted from FIG. 3C that the shape of the slot weld bead is of a wedge shape that is particularly strong in tension, as is appropriate since the fluid conduit ramp in accordance with the invention should be able to contain a static fluid pressure well in excess of 100 psi and preferably as high as 200 psi. The wedge-shaped bead and weld penetration into surrounding metal will tend to tighten under tension to minimize any leakage even if cracks occur or develop in the weld or brazed connection.

It should also be noted from FIG. 3 that the bottom plate is preferably formed of 3/16 inch thick 6061 aluminum whereas the top plate and strips that form partitions are preferably of ¼ inch thickness of the same material. These thicknesses of heat treated 6000 series aluminum is commercially available and is preferably of a hardness referred to as "6T". It should be appreciated, however, that welding or brazing will anneal regions of the material and the entire structure should again be heat treated to relieve stresses in the material developed when the weld or braze cools as well as restoring the original hardness of the material. A lesser thickness for the bottom or base plate is desirable to save weight since the base plate is supported by the ground and carries no load. Three-sixteenths inch thickness is also considered to be an optimal thickness for stabilizing the vertical portions, facilitating welding or brazing operations and limiting distortion due to the welding or brazing processes or internal pressures. It should also be noted that this technique avoids doubled thickness of the vertical structures that would result from constructing a topologically similar structure from square tubes as disclosed in U.S. Pat. No. 5,755,527 which is directed to a fluid conduit ramp for much lower flow rates and longer periods of deployment as would be appropriate to supplying water to a construction site but completely inappropriate to fire-fighting; requiring rapid deployment, high pressures and extremely high flow rates. Use of discrete tubes as disclosed therein would also preclude reducing thickness of the bottom of the structure which, as disclosed, is doubled with a bottom plate.

In contrast, the invention thus reduces weight of the fluid conduit ramp 10 while increasing strength, cross-sectional conduit area, flow rate and reduced pressure drop. The fluid conduit ramp of the invention constructed in the preferred manner and having a length of approximately ten feet can be held to a weight of well below two hundred pounds which is comparable to but significantly less than the assembled weight of a commercially available hose bridge described above and can thus be deployed by two or three persons while developing an extremely strong structure capable of carrying heavy vehicular loads in excess of fourteen tons per axle (the load specification for the commercially available hose bridges discussed above) due to the high resistance to buckling of the very short and relatively thick vertical portions (e.g. having an aspect ratio of about 8:1 and preferably in a range of less than 12:1) and the similarly short top and bottom spans of the triangular and substantially square internal sub-conduits 30 and 28. These structures are made more rigid by strain hardening of the sheet material as it is bent and further, by stresses induced by welding or brazing and the thickness and location of the weldments or brazed joints 34 as shown in FIG. 3B. Vehicular loads are also supported to a degree by the internal pressure in the fluid conduit ramp 10 which, in use, will be generally in the range of fifty to one hundred psi (well above the air pressure within most vehicular tires).

It should also be appreciated that the structure described above can be formed by extrusion. However, extrusion is not currently preferred since the initial cost of tooling to provide a relatively large shape is very expensive. Additionally, welding or brazing processes would still be required for construction and attachment of manifolds and streamlining of conduit ends where a long extrusion is cut to an appropriate length, both as will be described below, would be made more difficult.

As an example of use and operation of the invention, many municipalities provide water supplies for fire-fighting through hydrants capable of flow rates of one thousand two hundred fifty gallons per minute at a static water system pressure of fifty to sixty psi. At such a flow rate, there will be a pressure drop of about ten psi per hundred feet of nominally five inch outside diameter large diameter hose (LDH). For fire-fighting, it is generally desirable to increase water pressure to one hundred psi or more as is usually achieved by a pump arrangement included in mobile firefighting equipment. An inlet pressure to such pumping arrangements is preferably kept at or above about twenty psi. Therefore, the pumping arrangement must be located within a maximum of three hundred feet of a fire hydrant. If a greater distance is required, pumps can be deployed in a relay arrangement with a plurality of pumping stages. A relay arrangement may also involve placing a pump close to the fire hydrant to increase pressure and flow rate to another pumping arrangement closer to the actual fire as may be required if a smaller diameter hose having a much higher pressure drop must be used for connection to a fire hydrant. As will be described in greater detail below, the invention achieves water pressure loss reduction at high flow rates well below a thirty psi pressure loss (referred to as a device loss; a term applied to valves and other fittings used to connect or form branches in the hose deployment).

Figure 4:
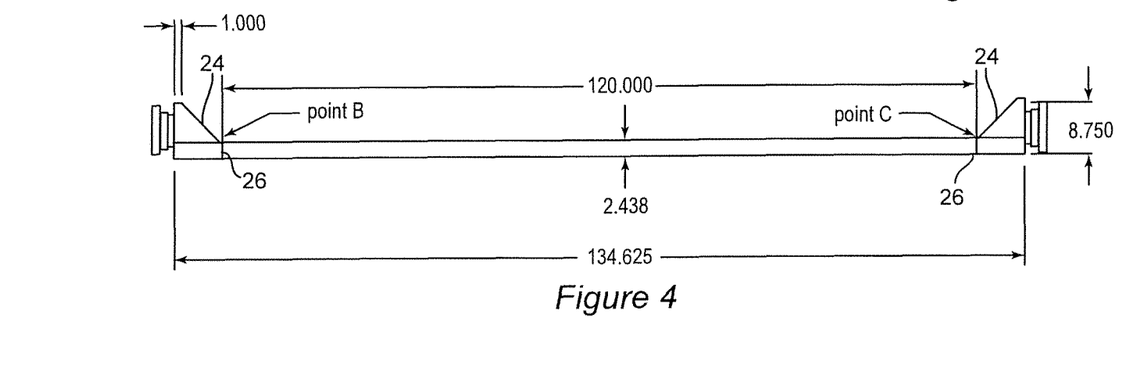
FIG. 4 is a side view of the fluid conduit ramp in accordance with the invention.

The low profile of the fluid conduit ramp in accordance with the invention is particularly evident from FIGS. 3 and 4. The overall height is comparable to and generally less than a relatively small roadway structure sometimes used (often unsuccessfully) for speed control and referred to as a "speed bump". The somewhat more angular shape and substantially flat upper surface causes an only very brief vertical transient force on a vehicle traversing the fluid conduit ramp which is rapidly damped by the suspension and pneumatic tires of the vehicle; allowing vehicles to pass over it at a speed of twenty miles per hour or more which is sufficient to quickly disperse traffic back-ups due to traffic interruptions that can be limited to a few minutes, at most. Thus traffic disruption is limited to a brief period for the fluid conduit ramp of the invention to be set in place before the traffic lane can be reopened with traffic speed only diminished to a relatively small degree. Hose connections can be made either before or after setting the fluid conduit ramp in place or even somewhat concurrently. The very short period of traffic interruption followed by return to reasonable speeds is extremely important in regions served by only a single road due to various geographic features (e.g. a mountain pass, islands or elongated land masses such as the outer banks and land surrounding so-called inland waterways such that traffic cannot be easily detoured) which are sometimes referred to as being a linear environment. In such locations, large traffic back-ups can accumulate rapidly and dissipate slowly, especially if traffic is limited to very low speeds when traffic lanes are re-opened after a lengthy interruption.

Figure 3D:
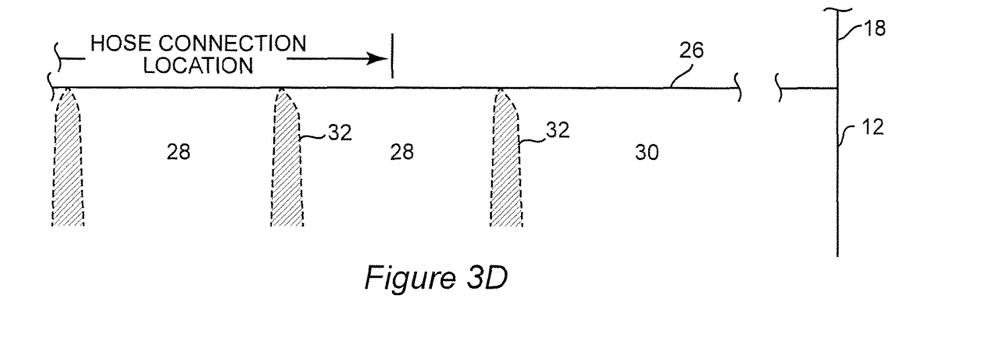
FIG. 3D illustrates a preferred shaping of ends of partitions to reduce device loss.

It should also be appreciated that while the low profile and increased internal surface area of the fluid conduit ramp would be expected to impose increased viscous drag on fluid flowing within it causing device drop in pressure, the cross-sectional areas can be made significantly larger than the cross-sectional area of common nominal hose sizes. For example, even allowing for the thickness of sheet metal in the cross-section of FIG. 3, the total cross-sectional area of the internal conduits (e.g. having only four substantially square sub-conduits and two triangular sub-conduits as illustrated in FIG. 3) is well in excess of sixteen square inches which is larger than the internal cross-sectional area of a nominally five inch outside diameter hose while the internal surfaces are continuous and of increased smoothness compared to a fire hose. Discontinuous weld bead constituting only a small percentage of the overall conduit length and streamlined shaping of the ends of the partitions relative to flow direction in the manifolds as illustrated in FIG. 3D also reduces pressure drop at high flow rates. (The asymmetry of the streamlining shapes relative to the location of the hose connection is preferred to more closely follow the approximate flow direction but the effect on pressure drop is likely to be marginal. Additionally, streamlining of the partitions can be enhanced by turning the ends of strips forming partitions slightly inward or providing optional additional short vanes of similar strips interposed near the outside lateral edges of the manifold or conduit for additional vertical strength and improvement in flow direction and distribution.) Therefore, the pressure drop in the fluid conduit ramp in accordance with the invention is comparable to the pressure drop in a similar length of a nominally five inch diameter hose at similar flow rates.

Figure 5:
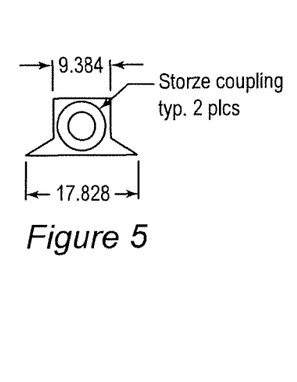
FIG. 5 is an end view of the fluid conduit ramp in accordance with the invention.

Referring now to FIGS. 4 and 5, the preferred form of manifolds 18 will now be discussed. As indicated above, the internal structure illustrated in FIG. 3 is terminated at dashed lines 26 at the edge or the manifolds. It is thus the principal function of the manifolds to distribute water to and collect water from the internal sub-conduits 28 and 30 at substantially equal pressures to maximize flow rates therein. As also alluded to above, the hose connections 20 can be angled toward the base or bottom plate so that input water flow will impinge thereon and be deflected laterally to increase pressure in the outer triangular and substantially square conduits. However, such an expedient compromises the ability to attach two or more fluid conduit ramps together with a short length of hose while allowing most of the length of the short hose to be supported by the ground. It has been found, however, that much the same effect can be achieved by providing an angled surface 24 for an axially directed water stream to impinge against in order to deflect the water flow downwardly and laterally and against vertical surfaces spaced apart by a distance only slightly greater than the diameter of the hose coupling 20, as shown in FIG. 5, and substantially equal to the width of the array of substantially square internal conduits but which defines a space that widens near the bottom of the opening in the hose coupling. This configuration is believed to develop higher pressure near the vertical portions of the sides of the manifolds which delivers increased water volume at high pressure to the triangular internal sub-conduits 30 and equalizes pressure at the inlets to the substantially square internal sub-conduits 28 to thereby maximize total water flow rate through the internal conduits of the fluid conduit ramp.

As alluded to above, several perfecting features can be optionally provided in accordance with the invention that are unnecessary to the successful practice of the invention in accordance with its basic principles but may enhance the performance thereof and/or increase convenience of use. For example, the streamlining of the ends of partitions illustrated in FIG. 3D and discussed above may improve flow distribution and reduce device loss in the fluid conduit ramp at particularly high flow rates.

The possibility of angling of the hose connection was also briefly discussed above. If such angling is provided, a preferred arrangement is illustrated in FIGS. 6A-6C. In this preferred arrangement the hose connection angle is approximately 20° to 25° and such an angle is preferred since such an angle allows the hose connection to be conveniently used as a handle when deploying the fluid conduit ramp whereas larger angles would be less usable as such. The important feature of this angling is to determine the angle and the geometry of the manifolds such that the axis 60 of the hose connection will approximately intersect dashed line 26 (indicating the end of the conduit portion 12, 14) at or slightly above the surface of the bottom plate to maximize lateral water flow distribution, even if an angle somewhat outside the range noted above results.

Two forms of another perfecting feature of the invention are illustrated in FIGS. 7A-7C and FIG. 8A-8C, respectively. While the fluid conduit ramp has been found to be quite resistant to horizontal movement due to automobile and light truck traffic, particularly when filled with water and connected to water-filled hoses, some tendency toward horizontal movement has been noted when a larger diameter tire (e.g. typical of freight trucks and fire-fighting equipment) rolls off of the fluid conduit ramp particularly when the fluid conduit ramp is empty and thus of reduced weight and/or when deployed on a particularly smooth surface such as epoxy-sealed concrete. While the exact reason for this effect is not known with certainty and the inventor does not wish to be held to any particular theory of this effect, the observed tendency is possibly due to a change in the shape of the periphery of large diameter tires as the load is transferred from the fluid conduit ramp to the ground beyond the ramp.

Figure 7A:
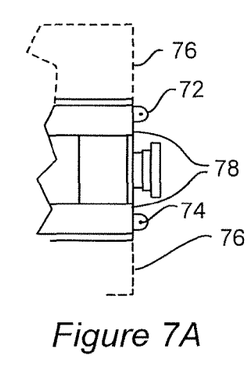
FIGS. 7A, 7B, and 7C are top, side and isometric views of a second perfecting feature of the invention.
Figure 7B:
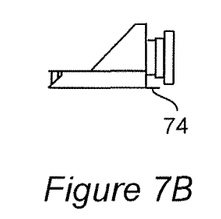
Figure 7C:
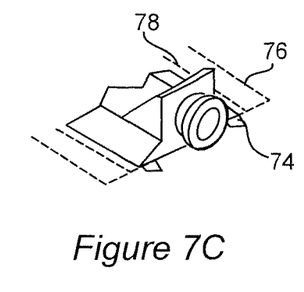

A first embodiment of a perfecting feature to eliminate horizontal movement of the fluid conduit ramp is illustrated in FIGS. 7A-7C. in this embodiment, the bottom plate is extended beyond the manifolds either by the initial cutting of the bottom plate or by the attachment (e.g. by welding or brazing) or a flange or tabs 72 which include apertures 74 that allow the fluid conduit ramp to be attached to the ground or pavement with, for example, spikes. A variation of this arrangement would be to extend the bottom plate or top plate laterally on one or both sides of the conduit preferably using a thinner plate which could be hinged to the fluid conduit ramp to provide a similar flange or tabs 76 illustrated by dashed lines. If such a lateral extension were to be made wider (by, for example, six inches) attachment to the ground could be avoided since the vehicle weight would still be imposed on the flange after contact with the triangular ramp portion was terminated.

A second preferred embodiment for reducing or eliminating the tendency for horizontal movement is illustrated in FIGS. 8A-8C. In this embodiment, the end plate 82 of the manifolds is extended to form tooth-like protrusions 84 which would grip the supporting ground or pavement. Variations of this embodiment could include (instead of or in addition to such projections) a surface treatment for the bottom plate with an expanded metal layer or a resilient material such as a rubber sheet.

Figure 9A:
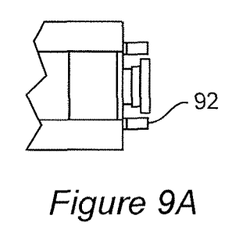

Another perfecting feature of the invention is illustrated in FIGS. 9A-9C. While the basic invention is of reduced weight in comparison with hose bridges and known fluid conduit ramp constructions such as is disclosed in U.S. Pat. No. 5,755,527, noted above, a section of the preferred ten to eleven foot length is of a greater weight than is convenient for one person to carry. However, wheels 92 can be placed on one end of the fluid conduit ramp in such a position that they extend below the bottom edge of the hose connection but remain above the plane of the bottom surface of the bottom plate. Thus wheels 92 are only brought into contact with the ground when the opposite end of the fluid conduit ramp is raised, as can be done while lifting only one-half the weight of the fluid conduit ramp. Thus wheels 92 allow the fluid conduit ramp to be deployed and positioned, as desired, by only one person.

It should be understood that any of the perfecting features of the invention described above can be used singly or in any combination. For example, the tabs or flanges of FIGS. 7A-7C can be used together with the tooth-like projections of FIGS. 8A-8C either with or without the features of FIGS. 3D, 6A-6C and or 9A-9C. Each perfecting feature included in an embodiment of the basic invention will increase performance and/or ease of use.

Figure 10:
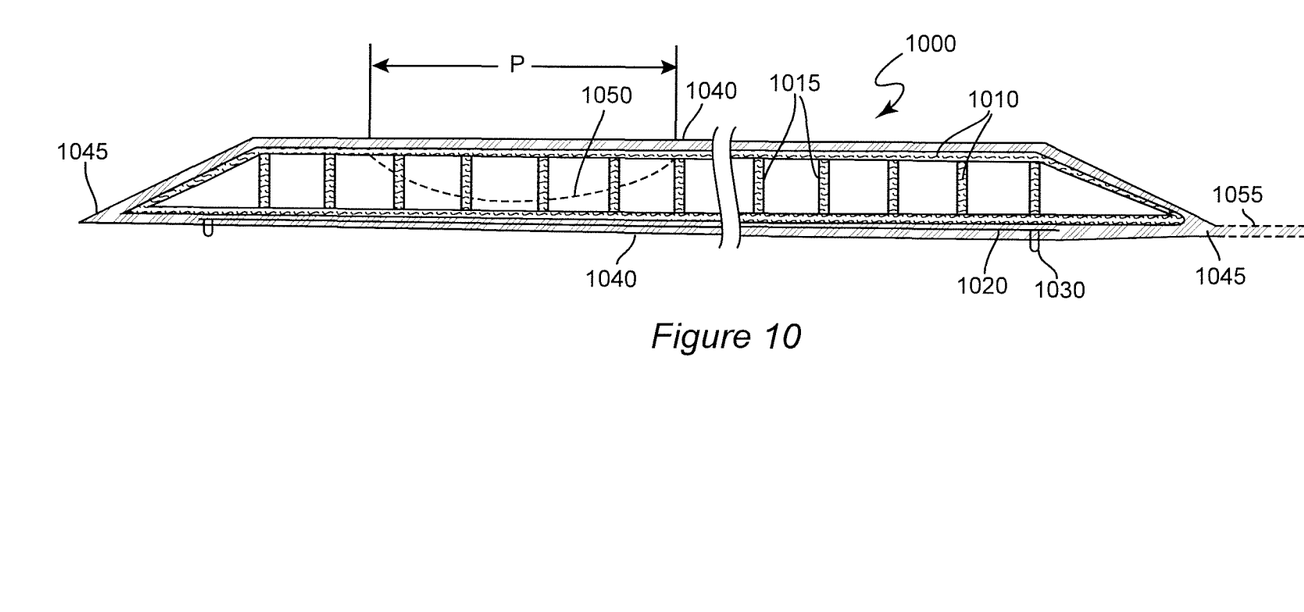
FIG. 10 is a cross-sectional view of an alternative embodiment of the invention.

Referring now to FIG. 10, an alternative embodiment of the invention that may be preferred for increased compatibility with existing fire-fighting equipment will now be discussed. Modern designs for mobile fire-fighting equipment has tended toward providing specialized compartments for portable gear or equipment which must be deployed at the scene of a fire. Since the invention is particularly suited to linear environments, as alluded to above, the preferred, rigid embodiment of the invention may not be convenient to carry in some mobile fire-fighting equipment of current design where specialized compartments are provided although it can be easily carried by mobile fire-fighting equipment currently in use although short lengths of rigid fluid conduit ramp that can be more easily accommodated in some mobile fire-fighting equipment are considered to be within the spirit and scope of the present invention, although not preferred. Accordingly, an alternative, flexible embodiment 1000 of the invention is provided in which the fluid conduit ramp is made of a relatively non-extensible, waterproof fabric 1010 such as fire hose material with manifolds as described above attached thereto in much the same manner as fire hose (e.g. Storze) couplings (not shown in FIG. 10) are attached to fire hoses. Optionally but preferably in this flexible embodiment, the manifolds may include vanes or flow deflectors to distribute and/or collect water flow entering or leaving the flexible fluid conduit ramp to direct water flow substantially evenly to the array of fluid passages formed by the partitions. Accordingly, this flexible embodiment can be collapsed into a flat form and folded or rolled in much the same way as normal fire hose and carried in any compartment designed to contain fire hose.

More specifically, this alternative embodiment of the invention is essentially a large tube of a length similar to the preferred embodiment described above or any other convenient length (e.g. to be deployed across multiple traffic lanes or formed in shorter sections to be connected by short lengths of fire hose). The tube should be of a circumference of at least forty inches and preferably of a circumference of approximately fifty to sixty inches or possibly more for reasons that will be discussed below. This tube is retained in a somewhat flattened mat-like shape when filled with pressurized fluid by partitions 1015 which, in this embodiment of the invention, can be water-permeable but should preferably be of a smooth material such as fiberglass cloth to reduce viscous drag on water flow and device pressure losses. The ramp shape at the ends of the cross-section can be maintained by a seam in the fabric. Flexible resilient strips 1020, preferably of metal such as spring steel can also be optionally but preferably be provided to also assist in maintaining a mat-like shape when in use as well as maintaining the fluid conduit ramp flat when drained and collapsed and folded and/or rolled. If provided, strips 1020 can also provide an attachment surface for protrusions 1030 to resist horizontal movement of the fluid conduit ramp by traffic across it when deployed, as described above in connection with FIGS. 7A-7C and 8A-8C. The plurality of strips 1020, being separate from each other, do not interfere with folding or rolling of this embodiment of the invention when drained and collapsed and can also allow the fluid conduit ramp to conform to roadways that may be significantly contoured such as dirt and gravel roadways.

It is also preferred to provide a flexible abrasion-resistant covering 1040 on either or both of the top and bottom and/or ramp portions of the fluid conduit ramp. Many materials such as a thin layer of vulcanized rubber as used in vehicle tires will be suitable for the purpose. The covering can also be formed in a flattened shape such that corners 1045 are formed that also assist in maintaining the ramp shape at the ends of the cross-section. Flanges 1055 can be provided on one or both sides of the cross-section of the fluid conduit ramp to function as discussed above in connection with FIGS. 7A-7C.

The transverse width of the fluid conduit ramp in accordance with the invention is preferably much greater than the rigid embodiment described above. While a vehicle wheel crossing the flexible fluid conduit ramp embodiment will be partially supported by the fluid pressure within the fluid conduit ramp, the weight of a vehicle will deform the flexible fluid conduit ramp to some possibly large degree, partially or fully closing some of the fluid carrying passages between the partitions, as indicated by dashed curve 1060. (As noted above, the weight of a vehicle will be partially supported by internal water pressure in the fluid conduit ramp when in use.) The contact patch dimension, P, (e.g. the length of normal contact of a vehicle tire on a roadway surface) illustrated in FIG. 10 by dashed line 1050 will be about eight inches for a passenger vehicle and about eleven inches for a large truck and the fluid-carrying passages in this region will be partially or fully closed by this deformation. However, the much larger transverse width of this flexible embodiment of the invention allows unrestricted fluid flow in the remainder of the fluid carrying passages that are not deformed. Therefore it is desirable that the cross-sectional area of the undeformed passages be at least approximately twice the cross-sectional area of a nominally five inch diameter fire hose. This increase in area relative to that of the rigid embodiment described above also compensates for the greater internal surface roughness and consequent viscous drag of the fabric and the possibly lower profile of the flexible embodiment of the invention. Therefore the fluid flow rate is not significantly diminished and the device loss in pressure is not significantly increased when the flexible embodiment of the invention is traversed by a vehicle.

In view of the foregoing, it is clearly seen that the fluid conduit ramp in accordance with the invention provides for rapid deployment requiring only a brief interruption of traffic flow when water for fighting a fire must cross a street, road or other thoroughfare, followed by re-opening of the traffic flow which can proceed at a sufficient speed to quickly dissipate the small traffic back-up that would accumulate during the brief period required for deployment of the fluid conduit ramp in accordance with the invention. Hose damage is completely avoided since the fluid conduit ramp replaces a section of hose that would otherwise be crossed by traffic. The invention is also of low profile but increased strength while being of reduced weight compared to currently commercially available hose bridges which do not adequately protect a fire hose and present problems of both tightly restricted speed and ground clearance for automobiles. The invention also provides a conduit exhibiting reduced device pressure drop at a given flow rate even compared with standard large diameter hose (LDH) having a nominal five inch outer diameter. The low profile of the fluid conduit ramp in accordance with the invention also facilitates storage since the ramp can be stored, for example, on edge in spaces that cannot accommodate a hose bridge even if the hose bridge is designed to be stored in a disassembled configuration. Particularly if the above-described perfecting features of the invention are included, the fluid conduit ramp can be quickly deployed by a minimum number of people and, once deployed, is less subject to being shifted in position by forces of traffic passing over it than is characteristic of hose bridges necessarily having higher profiles.

While the invention has been described in terms of a single preferred embodiment, those skilled in the art will recognize that the invention can be practiced with modification within the spirit and scope of the appended claims.

The invention claimed is:

1. A fluid conduit ramp comprising
   an array of laterally adjacent internal fluid conduits formed by vertical partitions extending between upper and lower internal surfaces of said fluid conduit ramp wherein said internal fluid conduits at lateral sides of said array form ramps,
   a manifold and a fluid carrying hose connection at each end of said array of laterally adjacent internal fluid conduits, wherein said manifold is configured to direct fluid flow from said fluid carrying hose connection laterally toward said lateral sides of said array to provide maximum total fluid flow through said array of laterally adjacent internal fluid conduits, and
   at least one wheel pivoted from a bracket attached to an end of said fluid conduit ramp.

2. The fluid conduit ramp as recited in claim 1, wherein said manifold includes a surface intersecting an axis of said fluid carrying hose connection at an angle.

3. The fluid conduit ramp as recited in claim 1, wherein an axis of said fluid carrying hose connection is formed at an angle to a said internal surface or said fluid conduit ramp.

4. The fluid conduit ramp as recited in claim 1, further including tabs extending from an end of said array of laterally adjacent internal fluid conduits.

5. The fluid conduit ramp as recited in claim 1, further including flanges extending laterally from said array of laterally adjacent internal fluid conduits.

6. The fluid conduit ramp as recited in claim 5, wherein said flange extends laterally for a distance sufficient for a vehicle tire to be positioned thereon without contacting an adjacent one of said ramps.

7. The fluid conduit ramp as recited in claim 1, further including a protrusion projecting downwardly from a bottom external surface of said array of laterally adjacent internal fluid conduits.

8. The fluid conduit ramp as recited in claim 1, wherein said bracket is positioned such that said wheel comes into contact with a supporting surface only when an opposite end of said fluid contact ramp is not in contact with said supporting surface.

9. The fluid conduit ramp as recited in claim 1, wherein said fluid conduit ramp is rigid and said partitions are attached to said upper and lower internal surfaces by welding or brazing.

10. The fluid conduit ramp as recited in claim 1, wherein said array of laterally adjacent internal fluid conduits are formed by extrusion.

11. The fluid conduit ramp as recited in claim 1, wherein ends of said partitions are tapered.

12. The fluid conduit ramp as recited in claim 11, wherein ends of said partitions are tapered at different angles or curvatures corresponding to different distances of separation from an axis of said fluid carrying hose connection.

13. The fluid conduit ramp as recited in claim 1, wherein said fluid conduit ramp is formed from aluminum.

14. A fluid conduit ramp comprising
   an array of laterally adjacent internal fluid conduits formed by vertical partitions extending between upper and lower internal surfaces of said fluid conduit ramp wherein said internal fluid conduits at lateral sides of said array form ramps, and a manifold and a fluid carrying hose connection at each end of said array of laterally adjacent internal fluid conduits, wherein said manifold is configured to direct fluid flow from said fluid carrying hose connection laterally toward said lateral sides of said array to provide maximum total fluid flow through said array of laterally adjacent internal fluid conduits, wherein said fluid conduit ramp is formed of flexible material, and wherein said fluid conduit ramp is formed in the shape of a flexible tube which is held in a shape including ramp portions and a mat-like portion between said ramp portions by flexible partitions.

15. The fluid conduit ramp as recited in claim 14, further including flanges extending laterally from said array of laterally adjacent internal fluid conduits.

16. The fluid conduit ramp as recited in claim 15, wherein said flange extends laterally for a distance sufficient for a vehicle tire to be positioned thereon without contacting an adjacent one of said ramps.

17. A fluid conduit ramp comprising at least two sections wherein each said section comprises an array of laterally adjacent internal fluid conduits formed by vertical partitions extending between upper and lower internal surfaces of said fluid conduit ramp wherein said internal fluid conduits at lateral sides of said array form ramps, wherein said fluid conduit ramp is formed of flexible material and wherein said fluid conduit ramp is formed in the shape of a flexible tube which is held in a shape including ramp portions and a mat-like portion between said ramp portions by flexible partitions, and a manifold and a fluid carrying hose connection at each end of said array of laterally adjacent internal fluid conduits, wherein said manifold is configured to direct fluid flow from said fluid carrying hose connection laterally toward said lateral sides of said array to provide maximum total fluid flow through said array of laterally adjacent internal fluid conduits, said fluid conduit ramp further comprising a length of fluid carrying hose connected between said two sections.

18. The fluid conduit ramp as recited in claim 17, wherein said manifold includes a surface intersecting an axis of said fluid carrying hose connection at an angle.

19. The fluid conduit ramp as recited in claim 17, wherein an axis of said fluid carrying hose connection is formed at an angle to a said internal surface or said fluid conduit ramp.

20. The fluid conduit ramp as recited in claim 17, further including tabs extending from an end of said array of laterally adjacent internal fluid conduits.

21. The fluid conduit ramp as recited in claim 17, further including flanges extending laterally from said array of laterally adjacent internal fluid conduits.

22. The fluid conduit ramp as recited in claim 21, wherein said flange extends laterally for a distance sufficient for a vehicle tire to be positioned thereon without contacting an adjacent one of said ramps.

\* \* \* \* \*